United States Patent
Chang et al.

(10) Patent No.: US 9,279,057 B2
(45) Date of Patent: Mar. 8, 2016

(54) THERMALLY CURABLE SOLDER-RESISTANT INK AND METHOD OF MAKING THE SAME

(71) Applicant: TAIFLEX SCIENTIFIC CO., LTD., Kaohsiung (TW)

(72) Inventors: Hsiu-Ming Chang, Kaohsiung (TW); Shih-Chang Lin, Kaohsiung (TW); Tzu-Ching Hung, Kaohsiung (TW)

(73) Assignee: Taiflex Scientific Co., Ltd., Kaohsiung (TW)

( * ) Notice: Subject to any disclaimer, the term of this patent is extended or adjusted under 35 U.S.C. 154(b) by 0 days.

(21) Appl. No.: 14/270,413

(22) Filed: May 6, 2014

(65) Prior Publication Data

US 2015/0322274 A1    Nov. 12, 2015

(51) Int. Cl.
C08L 63/00    (2006.01)
C08L 79/08    (2006.01)
C09D 11/102   (2014.01)

(52) U.S. Cl.
CPC .............. *C09D 11/102* (2013.01); *C08L 63/00* (2013.01); *C08L 79/08* (2013.01); *C08L 2205/05* (2013.01)

(58) Field of Classification Search
None
See application file for complete search history.

(56) References Cited

U.S. PATENT DOCUMENTS

2012/0248632 A1 * 10/2012 Mitsukura et al. ............ 257/787

FOREIGN PATENT DOCUMENTS

| TW | 200300111 | 5/2003 |
|----|-----------|--------|
| TW | 200801109 | 1/2008 |
| TW | 201141980 | 12/2011 |

* cited by examiner

*Primary Examiner* — Ana Woodward
(74) *Attorney, Agent, or Firm* — Fishman & Associates, LLC.

(57) ABSTRACT

A method of making a thermally curable solder-resistant ink, which comprises the following steps: polymerizing an aliphatic diamine monomer having a long carbon chain, an aromatic dianhydride monomer, an aromatic diamine monomer having a carboxylic acid group, and an anhydride monomer having a carboxylic acid group in an aprotic solvent to obtain a polyamine acid; cyclizing the polyamine acid to obtain a polyimide; and mixing the polyimide and a curing agent to obtain the thermally curable solder-resistant ink. By the steps mentioned above, the thermally curable solder-resistant ink made from the method has a dielectric constant less than 3.00 and a dielectric loss less than 0.01 and thereby is applicable to high frequency electronic equipments. Also, the thermally curable solder-resistant ink has good electrical properties, folding endurance, solder resistance, warpage resistance, flame resistance, acid endurance, alkali endurance, good solvent resistance and low water absorption.

15 Claims, No Drawings

THERMALLY CURABLE SOLDER-RESISTANT INK AND METHOD OF MAKING THE SAME

BACKGROUND OF THE INVENTION

1. Field of the Invention

The present invention relates to a thermally curable solder-resistant ink and a method of making the same; particularly relates to a thermally curable solder-resistant ink with low dielectric constant and low dielectric loss, and a method of making the same.

2. Description of the Prior Art(s)

Cover layer and thermally curable solder-resistant ink are used to protect circuits of the flexible printed circuit board. Compared to the calibration requirement for attaching a cover layer on the flexible printed circuit board, the thermally curable solder-resistant ink can be directly coated on the flexible printed circuit board. By using the thermally curable solder-resistant ink, the process of making the flexible printed circuit board can be simplified. Therefore, the thermally curable solder-resistant ink has gradually replaced the cover layer.

The commercial epoxy-based thermally curable solder-resistant ink can meet the requirement of general electronic equipments, but the commercial epoxy-based thermally curable solder-resistant ink has dielectric characteristics that cannot meet the requirement of high frequency electronic equipments. Therefore, the commercial epoxy-based thermally curable solder-resistant ink cannot be applied on high frequency electronic equipments.

To overcome the shortcomings, the present invention provides a thermally curable solder-resistant ink with low dielectric constant and low dielectric loss and a method of making the thermally curable solder-resistant ink to mitigate or obviate the aforementioned problems.

SUMMARY OF THE INVENTION

The main objective of the present invention is to provide a thermally curable solder-resistant ink with low dielectric constant and low dielectric loss that can be applied on high frequency electronic equipments, and a method of making the thermally curable solder-resistant ink.

The method of making the thermally curable solder-resistant ink in accordance with the present invention comprises the steps of:

polymerizing an aliphatic diamine monomer having a long carbon chain, an aromatic dianhydride monomer, an aromatic diamine monomer having a carboxylic acid group, and an anhydride monomer having a carboxylic acid group in an aprotic solvent to obtain a polyamine acid;

cyclizing the polyamine acid to obtain a polyimide; and mixing the polyimide and a curing agent to obtain the thermally curable solder-resistant ink.

In accordance with the method of the present invention, the long carbon chain of the aliphatic diamine monomer includes 6 to 40 carbons. In some embodiments, the aliphatic diamine monomer is hexamethylene diamine, heptamethylene diamine, octamethylene diamine, nonamethylene diamine or decamethylene diamine. The aliphatic diamine monomer having the long carbon chain has good hydrophobicity.

In accordance with the method of the present invention, the aromatic dianhydride monomer is selected from the group consisting of: 4,4-oxydiphthalic anhydride, 2,3,3',4'-biphenyl tetracarboxylic dianhydride, and a combination thereof.

In accordance with the method of the present invention, the aromatic diamine monomer having the carboxylic acid group is selected from the group consisting of: 3,5-diaminobenzoic acid, 5,5'-methylenedianthranilic and a combination thereof.

In accordance with the method of the present invention, the anhydride monomer having the carboxylic acid group is selected from the group consisting of: trimellitic anhydride, 1,2,4-cyclohexane tricarboxylic anhydride, and a combination thereof.

In accordance with the method of the present invention, in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the aliphatic diamine monomer having the long carbon chain is 60 to 62 weight percent (w.t. %) based on the total weight of the aliphatic diamine monomer having the long carbon chain, the aromatic dianhydride monomer, the aromatic diamine monomer having the carboxylic acid group, and the anhydride monomer having the acid carboxylic group.

In accordance with the method of the present invention, the aprotic solvent is selected from the group consisting of: n-methyl pyrrolidone, naphtha, xylene, 2-ethoxyethanol, methyl isobutylketone, and a combination thereof.

In accordance with the method of the present invention, in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the polymerization temperature ranges from 60° C. to 80° C.

In accordance with the method of the present invention, in the step of cyclizing the polyamine acid to obtain the polyimide, the polyamine acid is mixed with a catalyst and an organic solvent to obtain a pre-reaction solution; then the pre-reaction solution is heated to a cyclization temperature ranging from 125° C. to 175° C. to cyclize the polyamine acid and obtain the polyimide.

In accordance with the method of the present invention, in the step of mixing the polyimide and the curing agent to obtain the thermally curable solder-resistant ink, the curing agent is selected from the group consisting of: phenol novolac epoxy resin, bisphenol A epoxy resin, naphthalene epoxy resin, and a combination thereof.

In accordance with the method of the present invention, in the step of mixing the polyimide and the curing agent to obtain the thermally curable solder-resistant ink, the weight ratio of the polyimide and the curing agent ranges from 20:1 to 20:30.

The thermally curable solder-resistant ink in accordance with the present invention is made from the method mentioned above.

The thermally curable solder-resistant ink in accordance with the present invention has a dielectric constant less than 3.00 and a dielectric loss less than 0.01.

By the steps of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid; cyclizing the polyamine acid to obtain the polyimide; and mixing the polyimide and the curing agent to obtain the thermal solder-resistant ink, the thermally curable solder-resistant ink made from the method mentioned above has a dielectric constant less than 3.00 and a dielectric loss less than 0.01 and thereby is applicable on high frequency electronic equipments.

In addition, the thermally curable solder-resistant ink made from the method mentioned above has good electrical properties, good folding endurance, good solder resistance, good warpage resistance, good flame resistance, good acid endurance, good alkali endurance, good solvent endurance, and low water absorption rate.

Other objectives, advantages and novel features of the invention will become more apparent from the following detailed description when taken in conjunction with the accompanying drawings.

DETAILED DESCRIPTION OF THE PREFERRED EMBODIMENTS

Example 1

Fabrication of Polyimide 25 grams of aliphatic diamine monomer having a carbon chain with 36 carbons and 12 grams of 4,4-oxydiphthalic anhydride were mixed in an aprotic solvent and a first solution was obtained. The aprotic solvent comprised 60 grams of n-methyl pyrrolidone and 6.5 grams of naphtha. After the first solution was heated to and held at 70° C. for 1 hour, 1 gram of 3,5-diaminobenzoic acid was added into the first solution and a second solution was obtained. After the second solution was heated to and held at 70° C. for 1 hour, 2.5 grams of trimellitic anhydride was added into the second solution and a third solution was obtained. Afterwards the third solution was heated to and held at 70° C. for 1 hour, and a polyamine acid was obtained.

0.2 grams of triphenyl phosphine and 15 grams of toluene were mixed with the polyamine acid and a pre-reaction solution was obtained. The pre-reaction solution was processed with cyclization under a reaction condition of 150° C. and 3 hours and an intermediate product was obtained. The intermediate product was separated into toluene, triphenyl phosphine, and a polyimide. Toluene served as a solvent and triphenyl phosphine served as a catalyst.

Example 2

Fabrication of Polyimide

The present Example was similar to Example 1. The difference between the present Example and Example 1 was: 20 grams of the aliphatic diamine monomer having the carbon chain with 36 carbons and 12 grams of 4,4-oxydiphthalic anhydride were mixed in the aprotic solvent to obtain the first solution.

Example 3

Fabrication of Thermally Curable Solder-Resistant Ink 40 grams of the polyimide of Example 1 was mixed with 0.25 grams of triphenyl phosphine, 0.5 grams of pigment, 0.15 grams of defoamer, 4 grams of flame retardant, and 3.6 grams of phenol novolac epoxy resin, and a thermally curable solder-resistant ink was obtained. The triphenyl phosphine served as a curing agent.

Example 4

Fabrication of Thermally Curable Solder-Resistant Ink 40 grams of the polyimide of Example 2 was mixed with 0.25 grams of triphenyl phosphine, 0.5 grams of pigment, 0.15 grams of defoamer, 4 grams of flame retardant and 3.6 grams of phenol novolac epoxy resin were, and a thermally curable solder-resistant ink was obtained. The triphenyl phosphine served as a curing agent.

Comparison 1

Commercial Thermally Curable Solder-Resistant Ink

A thermally curable solder-resistant ink whose product ID was SN-9000NH purchased from Hitachi Chemical Co., (Taiwan) Ltd was used in the present comparison. 20 grams of the base resin and 1 gram of the curing agent of SN-9000NH were mixed and stirred for 10 minutes to obtain the thermally curable solder-resistant ink of the present comparison.

Comparison 2

Commercial Thermally Curable Solder-Resistant Ink

A thermally curable solder-resistant ink whose product ID was L45CM10/H45, purchased from Team Chemical Co., (Taiwan) Ltd was used in the present comparison. 90 grams of the base resin and 1 gram of the curing agent of L45CM10/H45 was mixed and stirred for 10 minutes to obtain the thermally curable solder-resistant ink of the present comparison.

Test

Each of the thermally curable solder-resistant inks of Examples 3 and 4 and Comparisons 1 and 2 was coated on a 1 oz/ft$^2$ copper foil, and a thermally curable solder-resistant layer 15 micrometers in thickness was obtained. The copper foil and the thermally curable solder-resistant layer were baked in an oven under 160° C. for 1 hour and a cured thermally curable solder-resistant layer laminated on the copper foil was obtained.

The volume resistance, surface resistance, dielectric constant ($D_k$), dielectric loss ($D_f$), breakdown voltage, thermal decomposition temperature ($T_d$), coefficient of thermal expansion (C.T.E.), glass transition temperature ($T_g$), folding endurance, solder resistance, water absorption rate, warpage resistance, flame resistance, acid endurance, alkali endurance and solvent endurance of the cured thermally curable solder-resistant layer were measured and evaluated. The results were shown in Table 1 and the measurement and evaluations were as follows.

The volume resistance was measured by the method of IPC-TM-650 2.5.17.1A and by the 4339B insulation tester of Hewlett-Packard Co. under 90 volts.

The surface volume resistance was measured by the method of IPC-TM-650 2.5.17.1A and by the 4339B insulation tester of Hewlett-Packard Co. under 90 volts.

The breakdown voltage was measured by the method of ASTM D149 and by the 7474 breakdown voltage equipment of Measurement Technology Co. (Taiwan) Ltd. under 20 kilovolts/5 milliamperes (20 kV/5 mA).

The dielectric constant and dielectric loss were measured by the method of IPC-TM-650 2.5.5.1B and by the ZVB20 network analyzer of Rohde & Schwarz Co. under 10 gigahertz (GHz).

The thermal decomposition temperature was the temperature at which the weight of the cured thermally curable solder-resistant layer was 5.0% less than its weight measured at 300° C. The thermal decomposition temperature was measured by Pyris Diamond thermogravimetric/differential thermal analyzer of PerkinElmer Co. in a temperature range between 40° C. and 600° C. and with a temperature gradient of 20° C. per minute.

The coefficient of thermal expansion and glass transition temperature were measure by Pyris Diamond thermal mechanical analyzer of PerkinElmer Co. in a temperature range between 50° C. and 200° C. and with a temperature gradient of 20° C. per minute.

To evaluate the folding endurance, the folding times of the cured thermally curable solder-resistant layer was measured by HT-8636A MIT folding endurance tester of Hung Ta instrument Co. under 0.8R/500 g. The more times the cured thermally curable solder-resistant layer was folded, the better the folding endurance was.

To evaluate the solder resistance, the cured thermally curable solder-resistant layer was preheated and soldered afloat at 300° C. for 30 seconds. If the cured thermally curable solder-resistant layer was not blistering, delaminating or wrinkling, the cured thermally curable solder-resistant layer passed the solder resistance evaluations and had good solder resistance.

The water absorption rate was measured by the method of IPC-TM-650 2.6.2.1.

To evaluate the warpage resistance, the copper foil and the cured thermally curable solder-resistant layer laminated on the copper foil were cropped into a 10 cm×10 cm sample and placed on a glass substrate. The cured thermally curable solder-resistant layer and the glass substrate were located at the opposite sides of the copper foil and the copper foil was attached to the glass substrate. The average of the distances between the four corners of the sample and the glass substrate was defined as the warpage value. The smaller the warpage value was, the better the warpage resistance was.

The flame resistance was evaluated by UL94 VTM-0. If the cured thermally curable solder-resistant layer passed UL94 VTM-0, the cured thermally curable solder-resistant layer was regarded as having good flame resistance.

To evaluate the acid endurance, the cured thermally curable solder-resistant layer was immersed in 10 vol. % sulfuric acid ($H_2SO_4$) for 30 minutes. If there was no swelling, delamination, or color change after the immersing of the cured thermally curable solder-resistant layer, the cured thermally curable solder-resistant layer passed the acid endurance evaluation and had good acid endurance.

To evaluate the alkali endurance, the cured thermally curable solder-resistant layer was immersed in 10 vol. % sodium hydroxide (NaOH) for 30 minutes. If there was no swelling, delamination, or color change after the immersing of the cured thermally curable solder-resistant layer, the cured thermally curable solder-resistant layer passed the alkali endurance evaluation and had good alkali endurance.

To evaluate the solvent endurance, the cured thermally curable solder-resistant layer was immersed in isopropyl alcohol ($C_3H_7OH$) and methyl ethyl ketone ($CH_3C(O)CH_2CH_3$) for 30 minutes. If there was no swelling, delamination, or color change after the immersing of the cured thermally curable solder-resistant layer, the cured thermally curable solder-resistant layer passed the solvent endurance evaluation and had good solvent endurance.

TABLE 1 the results of the Test

| | Example 3 | Example 4 | Comparison 1 | Comparison 2 |
|---|---|---|---|---|
| Volume resistance | $3.72 \times 10^{15}$ Ω | $3.88 \times 10^{15}$ Ω | $6.80 \times 10^{13}$ Ω | $4.50 \times 10^{14}$ Ω |
| Surface resistance | $1.46 \times 10^{14}$ Ω-cm | $2.52 \times 10^{14}$ Ω-cm | $2.74 \times 10^{15}$ Ω-cm | $6.30 \times 10^{13}$ Ω-cm |
| Dielectric constant | 2.87 | 2.92 | 3.13 | 3.55 |
| Dielectric loss | 0.0040 | 0.0080 | 0.0126 | 0.0207 |
| Breakdown voltage | 115 volt/μm | 116 volt/μm | 110 volt/μm | 9 volt/μm |
| $T_d$ | 374° C. | 366° C. | 318° C. | 360° C. |
| C.T.E. | 236 ppm/° C. | 258 ppm/° C. | 316 ppm/° C. | 294 ppm/° C. |
| $T_g$ | 65° C. | 63° C. | 59° C. | 98° C. |
| Folding times | 2345 times | 2330 times | 2360 times | 893 times |
| Solder resistance evaluation | Passed | Passed | Passed | Passed |
| UL94 VTM-0 | Passed | Passed | Not passed | Not passed |
| Water absorption rate | 0.15% | 0.21% | 0.4% | 1.3% |
| Warpage value | Less than 5 mm | Less than 5 mm | Less than 5 mm | Greater than 5 mm |
| Acid endurance evaluation | Passed | Passed | Passed | Passed |
| Alkali endurance evaluation | Passed | Passed | Passed | Passed |
| Solvent endurance evaluation ($C_3H_7OH$) | Passed | Passed | Passed | Passed |
| Solvent endurance evaluation [$CH_3C(O)CH_2CH_3$] | Passed | Passed | Passed | Passed |

With reference to Table 1, the dielectric constants of the cured thermally curable solder-resistant layers made from the thermally curable solder-resistant inks of Examples 3 and 4 were lower than 3.00 while the dielectric constants of those made from the thermally curable solder-resistant inks of Comparisons 1 and 2 were higher than 3.00. Also, the dielectric losses of the cured thermally curable solder-resistant layers made from the thermally curable solder-resistant inks of Examples 3 and 4 were lower than 0.01 while the dielectric losses of those made from the thermally curable solder-resistant inks of Comparisons 1 and 2 were higher than 0.01. Thus, the dielectric losses of those made from the thermally curable solder-resistant inks of Examples 1 and 2 were both lower than the dielectric losses of those made from the thermally curable solder-resistant inks of Comparisons 1 and 2. Accordingly, the thermally curable solder-resistant inks of Examples 1 and 2 were more applicable on high frequency electronic equipments than those of Comparisons 1 and 2.

With reference to Table 1, the water absorption rates of the cured thermally curable solder-resistant layers made from the thermally curable solder-resistant inks of Examples 3 and 4 were 0.15% and 0.21%, respectively. The water absorption rate of the cured thermally curable solder-resistant layers made from the thermally curable solder-resistant inks of Comparisons 1 and 2 were 0.4% and 1.3%, respectively. Accordingly, the water absorption rates of those made from the thermally curable solder-resistant inks of Examples 1 and 2 were both lower than the water absorption rate of those made from the thermally curable solder-resistant inks of Comparisons 1 and 2.

With reference to Table 1, the cured thermally curable solder-resistant layers made from the thermally curable solder-resistant inks of Examples 3 and 4 passed UL 94 VTM-0 test while those made from the thermally curable solder-resistant inks of Comparisons 1 and 2 did not. Accordingly, the cured thermally curable solder-resistant layers made from the thermally curable solder-resistant inks of Examples 3 and 4 had better flame resistance than those made from the thermally curable solder-resistant inks of Comparisons 1 and 2.

With reference to Table 1, the cured thermally curable solder-resistant layers made from the thermally curable solder-resistant inks of Examples 3, 4 and Comparison 1 could be respectively folded for 2345 times, 2330 times, and 2360 times, which were very close to each other, while the cured thermally curable solder-resistant layers made from the thermally curable solder-resistant ink of Comparison 2 could only be folded for 893 times. Accordingly, the cured thermally curable solder-resistant layers made from the thermally curable solder-resistant inks of Examples 3 and 4 had good folding endurance.

With reference to Table 1, the volume resistance, surface resistance and breakdown voltage of the cured thermally curable solder-resistant layers made from the thermally curable solder-resistant inks of Examples 3 and 4 were higher than the volume resistance, surface resistance and breakdown voltage of those made from the thermally curable solder-resistant inks of Comparisons 1 and 2. Accordingly, the cured thermally curable solder-resistant layers made from the thermally curable solder-resistant inks of Examples 3 and 4 had a better electrical characteristic than those made from the thermally curable solder-resistant inks of Comparisons 1 and 2.

With reference to Table 1, the thermal decomposition temperature ($T_d$) and glass transition temperature ($T_g$) of the cured thermally curable solder-resistant layers made from the thermally curable solder-resistant inks of Examples 3 and 4 were higher than the thermal decomposition temperature ($T_d$) and glass transition temperature ($T_g$) of those made from the thermally curable solder-resistant inks of Comparisons 1 and 2. In addition, the coefficient of thermal expansion (C.T.E.) of the cured thermally curable solder-resistant layers made from the thermally curable solder-resistant inks of Examples 3 and 4 were smaller than the coefficient of thermal expansion (C.T.E.) of that made from the thermally curable solder-resistant ink of Comparisons 1 and 2. As a whole, the cured thermally curable solder-resistant layers made from the thermally curable solder-resistant inks of Examples 3 and 4 had a better thermal stability than those made from the thermally curable solder-resistant inks of Comparisons 1 and 2.

With reference to Table 1, the warpage values of the cured thermally curable solder-resistant layers made from the thermally curable solder-resistant inks of Examples 3 and 4 were less than 5 millimeters (mm) while the warpage value of the cured thermally curable solder-resistant layer made from the thermally curable solder-resistant ink of Comparison 2 was greater than 5 millimeters (mm). Thus, the cured thermally curable solder-resistant layers made from the thermally curable solder-resistant inks of Examples 3 and 4 had a better warpage resistance than the cured thermally curable solder-resistant layer made from the thermally curable solder-resistant ink of Comparison 2. Accordingly, compared with the cured thermally curable solder-resistant layer made from the thermally curable solder-resistant ink of Comparison 2, the cured thermally curable solder-resistant layers made from the thermally curable solder-resistant inks of Examples 3 and 4 had less shrinkage, sustained a specific shape, and had better deformability.

With reference to Table 1, the cured thermally curable solder-resistant layers made from the thermally curable solder-resistant inks of Examples 3 and 4 and Comparisons 1 and 2 passed solder resistance evaluation, acid endurance evaluation, alkali endurance evaluation and solvent endurance evaluation. Thus, the cured thermally curable solder-resistant layers made from the thermally curable solder-resistant inks of Examples 3 and 4 had equivalent chemical properties to those made from the thermally curable solder-resistant inks of Comparisons 1 and 2.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of making a thermally curable solder-resistant ink comprising steps of:
    polymerizing an aliphatic diamine monomer having a long carbon chain, an aromatic dianhydride monomer, an aromatic diamine monomer having a carboxylic acid group, and an anhydride monomer having a carboxylic acid group in an aprotic solvent to obtain a polyamine acid;
    cyclizing the polyamine acid to obtain a polyimide; and
    mixing the polyimide and a curing agent to obtain the thermally curable solder-resistant ink,
    wherein the long carbon chain of the aliphatic diamine monomer includes 36 to 40 carbons, and the curing agent is selected from the group consisting of: phenol novolac epoxy resin, bisphenol A epoxy resin, naphthalene epoxy resin, and a combination thereof.

2. The method as claimed in claim 1, wherein in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the aliphatic diamine monomer having the long carbon chain ranges from 60 to 62 weight percent based on the total weight of the aliphatic diamine monomer having the long carbon chain, the aromatic dianhydride monomer, the aromatic diamine monomer having the carboxylic acid group, and the anhydride monomer having the carboxylic acid group.

3. The method as claimed in claim 2, wherein the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid comprises
polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent under a polymerization temperature ranging from 60° C. to 80° C. to obtain the polyamine acid.

4. The method as claimed in claim 3, wherein the step of cyclizing the polyamine acid to obtain the polyimide comprises
mixing the polyamine acid with a catalyst and an organic solvent to obtain a pre-reaction solution; and
heating the pre-reaction solution to a cyclization temperature ranging from 125° C. to 175° C. to obtain the polyimide;
the organic solvent is toluene; and
the aprotic solvent is selected from the group consisting of: n-methyl pyrrolidone, naphtha, xylene, 2-ethoxyethanol, methyl isobutylketone, and a combination thereof.

5. The method as claimed in claim 4, wherein the step of mixing the polyimide and the curing agent to obtain the thermally curable solder-resistant ink comprises
mixing the polyimide and the curing agent in a weight ratio ranging from 20:1 to 20:3 to obtain the thermal solder-resistant ink.

6. The method as claimed in claim 1, wherein the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid comprises
polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent under a polymerization temperature ranging from 60° C. to 80° C. to obtain the polyamine acid.

7. The method as claimed in claim 1, wherein the step of cyclizing the polyamine acid to obtain the polyimide comprises
mixing the polyamine acid with a catalyst and an organic solvent to obtain a pre-reaction solution; and
heating the pre-reaction solution to a cyclization temperature ranging from 125° C. to 175° C. to obtain the polyimide;
the organic solvent is toluene; and
the aprotic solvent is selected from the group consisting of: n-methyl pyrrolidone, naphtha, xylene, 2-ethoxyethanol, methyl isobutylketone, and a combination thereof.

8. The method as claimed in claim 1, wherein the step of mixing the polyimide and the curing agent to obtain the thermally curable solder-resistant ink comprises
mixing the polyimide and the curing agent in a weight ratio ranging from 20:1 to 20:3 to obtain the thermally curable solder-resistant ink.

9. The method as claimed in claim 1, wherein in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the aprotic solvent is selected from the group consisting of: n-methyl pyrrolidone, naphtha, xylene, 2-ethoxyethanol, methyl isobutylketone, and a combination thereof.

10. The method as claimed in claim 1, wherein in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the aromatic dianhydride monomer is selected from the group consisting of: 4,4-oxydiphthalic anhydride, 2,3,3',4'-biphenyl tetracarboxylic dianhydride, and a combination thereof.

11. The method as claimed in claim 1, wherein in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the aromatic diamine monomer having the carboxylic acid group is selected from the group consisting of: 3,5-diaminobenzoic acid, 5,5'-methylenedianthranilic, and a combination thereof.

12. The method as claimed in claim 1, wherein in the step of polymerizing the aliphatic diamine monomer having the long carbon chain, the aromatic dianhydride monomer, the aromatic diamine monomer having the carboxylic acid group, and the anhydride monomer having the carboxylic acid group in the aprotic solvent to obtain the polyamine acid, the anhydride monomer having the carboxylic acid group is selected from the group consisting of: trimellitic anhydride, 1,2,4-cyclohexane tricarboxylic anhydride, and a combination thereof.

13. A thermally curable solder-resistant ink comprising:
a polyimide obtained by cyclizing a polyamine acid; and
a curing agent selected from the group consisting of: phenol novolac epoxy resin, bisphenol A epoxy resin, naphthalene epoxy resin, and a combination thereof,
wherein the polyamine acid is obtained by polymerizing an aliphatic diamine monomer having a long carbon chain, an aromatic dianhydride monomer, an aromatic diamine monomer having a carboxylic acid group, and an anhydride monomer having a carboxylic acid group in an aprotic solvent;
the long carbon chain of the aliphatic diamine monomer includes 36 to 40 carbons; and
the thermally curable solder-resistant ink has a dielectric constant less than 3.00 and a dielectric loss less than 0.01.

14. The thermally curable solder-resistant ink as claimed in claim 13, wherein the aliphatic diamine monomer having the long carbon chain ranges from 60 to 62 weight percent based on the total weight of the aliphatic diamine monomer having the long carbon chain, the aromatic dianhydride monomer, the aromatic diamine monomer having the carboxylic acid group, and the anhydride monomer having the carboxylic acid group.

15. The thermally curable solder-resistant ink as claimed in claim 13, wherein the weight ratio of the polyimide and the curing agent ranges from 20:1 to 20:3.

* * * * *